United States Patent [19]

Jester et al.

[11] Patent Number: 5,210,107

[45] Date of Patent: May 11, 1993

[54] FOAMED LIQUID CRYSTAL POLYMER FILM/SHEET HAVING IMPROVED FLEXIBILITY AND CELL UNIFORMITY

[75] Inventors: Randy D. Jester; Detlef K. M. Frank, both of Greer, S.C.

[73] Assignee: Hoechst Celanese Corp., Somerville, N.J.

[21] Appl. No.: 642,495

[22] Filed: Jan. 17, 1991

[51] Int. Cl.$^5$ ............................ C08J 9/08; C08J 9/12
[52] U.S. Cl. ................................. 521/182; 264/53; 264/54; 521/79; 521/81; 521/82; 521/92; 521/97; 521/98
[58] Field of Search ............... 521/182, 79, 82, 97; 264/53, 54

[56] References Cited

U.S. PATENT DOCUMENTS

| | | | |
|---|---|---|---|
| 4,224,264 | 9/1980 | Ort et al. | 521/182 |
| 4,312,960 | 1/1982 | Ort et al. | 521/182 |
| 4,429,060 | 1/1984 | Ide | 521/182 |
| 4,462,947 | 7/1984 | Huggard | 521/182 |
| 4,473,665 | 9/1984 | Martini-Vivedensky | 521/182 |
| 4,588,754 | 5/1986 | Lisa | 521/182 |

*Primary Examiner*—Morton Foelak
*Attorney, Agent, or Firm*—Joseph M. Mazzarese

[57] ABSTRACT

A flexible foamed liquid crystal polymer film or sheet having uniformly small cells or bubbles. The foam cells are essentially spherical and have mean diameters less than or equal to approximately 250 microns. The cell size distribution is relatively small. The foamed sheet is made by extruding the polymer through a die under pressure at a temperature near or below the polymer's melting point; a gas or chemical blowing agent is extruded with the polymer to produce foaming as the polymer exits the die.

14 Claims, 1 Drawing Sheet

FOAMED LIQUID CRYSTAL POLYMER FILM/SHEET HAVING IMPROVED FLEXIBILITY AND CELL UNIFORMITY

BACKGROUND OF THE INVENTION

This invention relates to the field of foamed plastics, especially foamed liquid crystal polymer sheets or films.

Foamed plastics are well-known. They are particularly useful where light weight or high strength-to-weight ratios are needed. Uses include construction materials, transportation vehicles, industrial equipment, business machines, insulation, and the like. However, many plastics suffer a great reduction in desirable mechanical properties when foamed.

Liquid crystal polymer ("LCP") foams are known in the art. In addition to the advantages inherent in foamed plastics generally, foamed LCP is beneficial for applications requiring LCP properties, e.g. high tensile strength, high temperature performance, chemical resistance and impact strength, but low anisotropy or orientation. U.S. Pat. Nos. 4,429,060 and 4,429,061 describe such foams; the disclosures in these patents are herein incorporated by reference.

U.S. Pat. No. 4,429,060 describes high performance foams comprising at least about 10% of recurring 6-oxy-2-naphthoyl moieties. These lightweight foams are said to have a good strength-to-weight ratio, high thermal stability and excellent solvent resistance. The foams have less anisotropy than unfoamed LCP. These foams may be made in any conventional manner, such as extrusion or injection molding. A blowing agent is needed to cause foaming; suitable conventional blowing agents include 5-phenyltetrazole and trihydrazine triazine.

U.S. Pat. No. 4,429,061 is directed to heat treated LCP foams having a high degree of rigidity and strength. The core of the LCP foams have highly oriented cell walls, and the properties of these cells are enhanced by heat treatment. These foamed LCP's have a low degree of anisotropy compared to unfoamed LCP.

Although the foamed LCP's known in the art have many advantages, their cell structure is not small enough or uniform enough for use as a flexible sheet or film. Their large, non-uniform cells can produce holes in the sheet, a poor surface, brittleness, and poor, non-uniform flexibility.

Unfoamed LCP can be used to produce a uniform, high quality sheet, but these sheets will have a high degree of stiffness. Furthermore, they will suffer from surface delamination and fracture under relatively small radius bends. Consequently, unfoamed LCP is unsuitable for many applications requiring relatively thick sheets. Unfoamed LCP also does not have the light weight, insulative properties and cost advantages of foamed sheet.

SUMMARY OF THE INVENTION

The present invention is a flexible foamed liquid crystal polymer film or sheet having uniformly small cells or bubbles. The foam cells have mean diameters in the approximate range of 10 to 250 microns. The cell size distribution is relatively narrow.

To produce the film or sheet of this invention, it is important to control the processing conditions carefully during the foaming operation. The process comprises the extrusion of LCP and blowing agent or gas composition under sufficient pressure at a temperature near or below its melting point. This process maximizes polymer melt viscosity in the die and localizes bubble expansion at the point of exit from the die.

It is an object of the present invention to provide a foamed liquid crystal polymer having relatively small, uniform foam cell sizes.

It is another object of this invention to provide a flexible foamed LCP film.

It is a further object of the present invention to provide a process for forming foamed LCP having small and relatively uniform cells.

Further objects of the present invention will be apparent to those skilled in the art from the following disclosure and the appended claims.

DETAILED DESCRIPTION OF THE PREFERRED EMBODIMENTS

Figure 1:
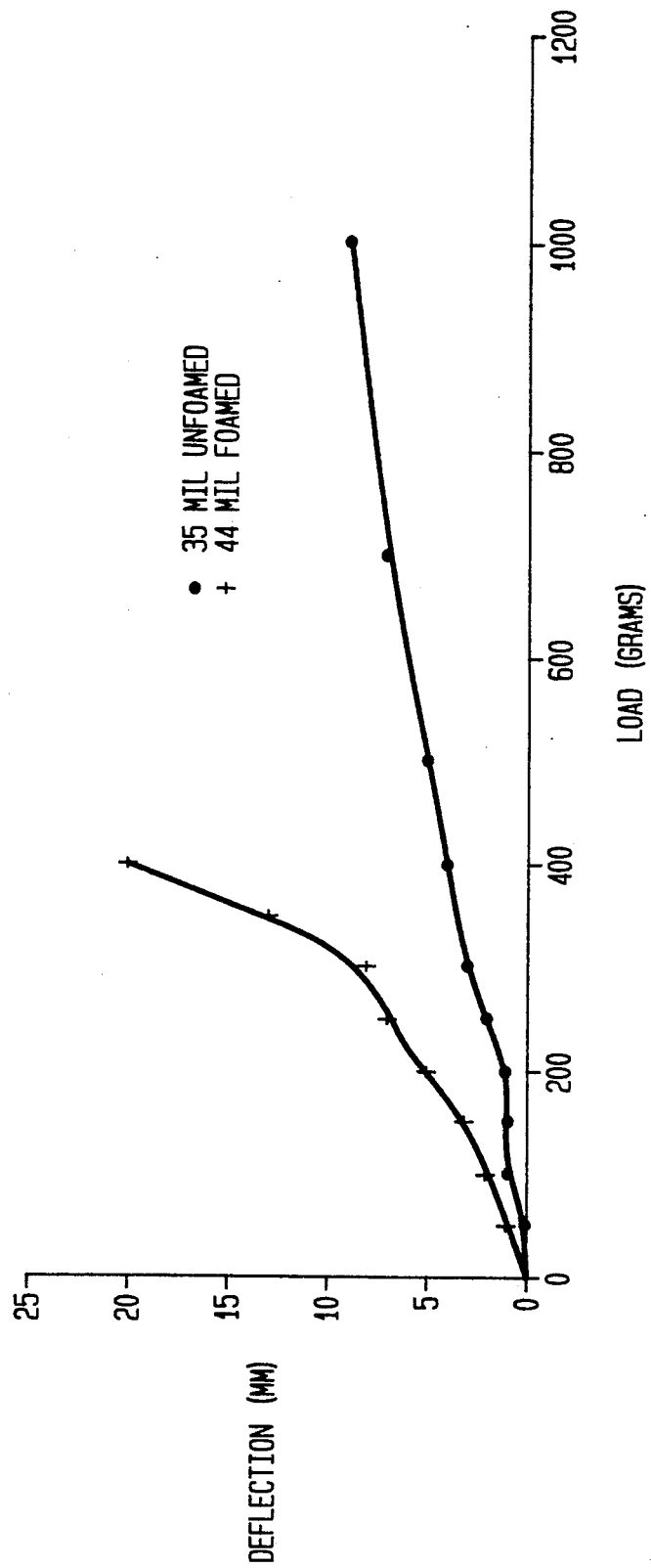
FIG. 1 graphically presents bending deflection data for both a foamed liquid crystal polymer sheet according to the present invention and an unfoamed liquid crystal polymer sheet.

The unique rheological properties of liquid crystal polymers distinguish them from polymers usually associated with foams. Due to their liquid crystal structure, LCP's have a unique rheological profile. They exhibit high shear thinning behavior and melt viscosities below those of polymers that are usually used to produce foamed products. To produce a foamed LCP having small, uniform bubbles or cells in accordance with the present invention, it is necessary to maximize the melt viscosity and localize bubble formation at the point where the LCP exits the die by maintaining a sufficiently high pressure throughout the die.

According to the present invention, a flexible foamed liquid crystal polymer sheet or film may be formed by extruding the LCP with a suitable blowing agent through a film/sheet die at a melt temperature close to or below the melting point of the LCP (as determined by DSC).

An LCP can continue to flow for a time under pressure at a temperature below its normally measured melting point, analogous to a supercooled liquid. It may be postulated that the highly oriented molecular structure of an LCP melt minimizes molecular entanglements and contributes to the ability of the polymer to flow under pressure at temperatures where it would solidify under static conditions. It is also possible that the "supercooled" LCP fluid may actually contain small crystallites. Whatever the reason, this attribute of LCP's is used to advantage in the process of the present invention to maximize the viscosity and melt strength of the polymer during extrusion and to encourage rapid cell structure formation as the polymer exits the die.

A chemical blowing agent having suitable temperature and rate of decomposition characteristics may be used in the practice of this invention. The blowing agent should not decompose before the polymer melts as this would be expected to produce a poor non-uniform cell structure. Some chemical blowing agents useful in the practice of the present invention include Hydrocerol HT, a product available from the Boehringer Ingelheim Company, and other citric acid esters.

Generally, the chemical blowing agent suitably comprises from about 0.1% to about 3% or more of the polymer melt composition, preferably about 1%. The optimum amount of chemical blowing agent depends upon the gas yield and foam required. Typically, the blowing agent is mixed with the LCP melt in an extruder to form an extrudable composition, after which the blowing agent decomposes into gases.

The blowing agent may also be a gas or gas mixture injected into the melt to foam the polymer. Examples of suitable gases include nitrogen, carbon dioxide, halogenated gases such as Freon or other fluorocarbons or chlorofluorocarbons, and mixtures thereof. The polymer and gaseous blowing agent may be homogenized prior to extrusion from the die.

A suitable blowing agent will not cause undesirable chemical reactions with the polymer, but will act only to produce foaming in the polymer.

The polymer initially may be heated above its melting point to melt the polymer, and to heat the chemical blowing agent sufficiently to insure complete gas formation, prior to extrusion.

The temperature of the LCP during extrusion is preferably as low as possible, i.e., the lowest temperature at which the LCP can be made to flow and extrude from the die. Preferably, the temperature will not significantly exceed the melting point of the LCP. The pressure that must be maintained in the die is that which is needed to make the polymer flow and to produce a sufficient pressure drop at the die exit so that the cell structure will be formed mainly at the point of exit from the die. Preferably, the pressure drop at the die lips will be at least about 10 bar, more preferably at least about 40 bar. The exact temperatures and pressures suitable for the practice of the present invention will depend upon the LCP, the die, and the rate of extrusion.

The foamed LCP sheet of the present invention preferably has cells that are substantially all spherical or near spherical in shape and that are substantially all no greater than about 250 microns in diameter. The cell diameters should be fairly uniform, as well. Preferably, the cell diameters are substantially all within 20% of the average cell diameter, and more preferably within 10% of the average.

Generally, the cell diameters are within the approximate range of 10-250 microns, although smaller cell sizes are possible. Typically, the cell diameters are in the approximate range of 50-175 microns, and often diameters of about 100-160 microns are achieved in the practice of this invention. For example, in one preferred embodiment of a foamed LCP sheet according to the present invention virtually all of the cells are approximately 120-140 microns in diameter. The exact cell diameters will 140 vary depending upon the particular process conditions, type and concentration of blowing agent, and LCP chosen by the practitioner.

As the foamed sheet or film of the present invention is extruded, it is desirable to maintain a sheet take-off rate that matches the extrusion rate to prevent stretching and maintain the isotropic properties generated by the foaming process. Faster take-off rates may be used, but will introduce anisotropy in the machine direction by stretching the sheet and distorting the cell structure, the degree of anisotropy being related to the ratio of the take-off rate to the extrusion rate; under such conditions, the cells will not remain spherical in shape. Ellipsoidal or elongated cells may be created by using a take-off rate substantially faster than the extrusion rate; however, if the rate differential becomes too great, the cell structure may be disrupted and cell uniformity may be absent. Take-off may be accomplished by a take-off roll or other conventional means.

Virtually any LCP capable of being melt extruded and foamed may be formed into a foamed sheet by the process of the present invention. Those skilled in the art will be able to determine whether a polymer falls in this category without undue experimentation.

Temperature control is very important in the process of the present invention. The suitable temperature range for extruding a polymer in accordance with this invention will be somewhat narrow since it should not exceed the melting point nor be so low as to cause solidification of the polymer prior to foaming. Consequently, it is important to maintain a uniform temperature within the die so that the LCP will be within the appropriate temperature range at all points therein.

The sheet or film of the present invention may be produced in a virtually unlimited range of thicknesses. The main limitation is that the film cannot be too thin relative to the bubble size. For example, if a film has cells about 160 microns in diameter it probably cannot be much less than about 30-40 mils thick. However, if the cells are smaller the film may be thinner, e.g., a foamed LCP having 20 micron cells could be used to make a film about 3-5 mils thick.

The following non-limiting Examples illustrate various embodiments of the present invention.

EXAMPLE I

Extrusion temperatures in the approximate range of 5-20° C. above the melting point are typically used for LCP films. However, this temperature is too high for producing foamed sheet according to the present invention.

In this experiment, sheets of the liquid crystal polymer known commercially as Vectra ® A910 resin (available from the Hoechst Celanese Corporation), an aromatic polyester comprising 27% repeating units derived from 4-hydrobenzoic acid and 73% repeating units derived from 6-hydroxy-2-naphthoic acid and having a melting point of about 282° C., were produced at a variety of temperatures in both foamed and unfoamed form. The polymer composition used to produce foamed sheet included 1% by weight Hydrocerol HT-70 foaming agent (available from Boehringer Ingelheim).

A foamed sheet produced at a metal temperature of 287° C. was of very poor quality, having large, non-uniform cells and a number of holes through the sheet. When the extrusion temperature was reduced to 270° C., well below the melting point of the polymer, the foam quality improved dramatically.

A 44 mil thick foamed sheet was produced at 270° C. with the take-off speed matched to the extrusion speed to preserve isotropy. An unfoamed Vectra ® sheet 35 mils thick was produced at 287° C. for comparison. The bending deflection characteristics of these two sheets were tested and compared. A one-inch wide machine direction strip of each sheet was placed on a base with a 10 cm separation, various loads were placed on the center, and the deflection in mm was measured as a function of the center load. The results are presented in FIG. I. These results show the far greater flexibility of the foamed sheet: although the stiff unfoamed sheet bends hardly at all, e.g. about 4 mm under a 400 gram load, the thicker foamed sheet exhibits a large degree of deflection under load, e.g. about 20 mm under a 400 gram load.

The unfoamed sheet is not suitable for forming small radius bends due to its stiffness and its tendency toward rupture and delamination of its highly oriented surface structure from its core structure, e.g., when bent 180 degrees around a 0.25 inch radius. In contrast, the foamed sheet can be bent 180 degrees around a 0.25 inch radius without fracture. Foaming breaks up the otherwise highly oriented LCP skin surface. The foamed sheet maintains partial "dead fold" characteristics after small radius bending most likely due to the crushed cells within the structure.

Density measurements revealed that the unfoamed sheet had a density of 1.4 g/cc whereas the foamed sheet had a density of 0.62 g/cc. The following Table I presents the results of other measurements that were made on these two sheets.

TABLE I

|  | Unfoamed Sheet | | Foamed Sheet | |
| --- | --- | --- | --- | --- |
|  | Machine Direction | Transverse Direction | Machine Direction | Transverse Direction |
| Tensile Modulus(psi) | 760,000 | 286,000 | 164,000 | 54,000 |
| Tensile Strength(psi) | 45,000 | 8,000 | 7,000 | 1,500 |
| % Elongation | 12 | 11 | 12 | 4 |
| Tear Propagation in Pounds | 3 | * | 1.4 | * |

* Turns and tears in machine direction

EXAMPLE II

Foamed Vectra ® A910 was produced according to the procedure of Example I except that 1% by weight CT 185 (available from Boehringer Ingelheim) was used as the foaming agent instead of Hydrocerol HT-70. This foamed polymer was freeze-fractured and observed via microscope at various magnifications using both transmitted and reflected light. Careful study of the cell structure under magnification revealed that the cells were evenly distributed and substantially all of the cells had diameters in the range of 120–140 microns.

Many variations of the present invention are possible without departing from the essence of the invention. The invention encompasses all the subject matter within the scope of the appended claims.

We claim:

1. A flexible liquid crystal polymer foam comprising foam cells wherein substantially all of said cells do not exceed 250 microns in diameter and said cells have a cell diameter distribution such that substantially all of said cell diameters are within about 20% of the average cell diameter.

2. A film or sheet comprising a foamed polymer according to claim 1.

3. A film or sheet according to claim 2 wherein said foamed polymer comprises an aromatic polyester comprising repeating units derived from 4-hydroxybenzoic acid and from 6-hydroxy-2-naphthoic acid.

4. A liquid crystal polymer foam according to claim 1 wherein said cells are substantially spherical and have diameters in the approximate range of 20–520 microns.

5. A liquid crystal polymer foam according to claim 4 wherein said cell diameters are in the approximate range of 50–175 microns.

6. A film or sheet comprising a foamed polymer according to claim 4.

7. A film or sheet according to claim 6 wherein said polymer comprises an aromatic polyester comprising repeating units derived from 4-hydroxybenzoic acid and from 6-hydroxy-2-naphthoic acid.

8. A liquid crystal polymer foam according to claim 4 wherein said cell diameters are in the approximate range of 100–160 microns.

9. A liquid crystal polymer foam according to claim 1 wherein said cells are substantially spherical.

10. A liquid crystal polymer foam according to claim 9 wherein said cells have a cell diameter distribution such that substantially all of said cell diameters are within about 10% of the average cell diameter.

11. A film or sheet comprising a liquid crystal polymer foam according to claim 9.

12. A film or sheet according to claim 11 wherein said liquid crystal polymer comprises an aromatic polyester comprising repeating units derived from 4-hydroxybenzoic acid and from 6-hydroxy-2-naphthoic acid.

13. A flexible liquid crystal polymer foam comprising foam cells, wherein substantially all of said cells do not exceed 250 microns in diameter and said cells have a cell diameter distribution such that substantially all of said cell diameters are within about 20of the average cell diameter, made according to a process comprising:
   melting a liquid crystal polymer;
   combining said liquid crystal polymer with a gas or chemical blowing agent to form an extrudable composition; and,
   forcing said composition through an extrusion die under pressure while maintaining said composition near or below the melting point of said polymer, said composition forming said liquid crystal polymer foam as it exits said die.

14. A film comprising the foam set forth in claim 13.

* * * * *